US009890710B2

(12) United States Patent
Klosinski et al.

(10) Patent No.: US 9,890,710 B2
(45) Date of Patent: Feb. 13, 2018

(54) POWER PLANT WITH STEAM GENERATION VIA COMBUSTOR GAS EXTRACTION

(71) Applicant: General Electric Company, Schenectady, NY (US)

(72) Inventors: Joseph Philip Klosinski, Kennesaw, GA (US); Alston Ilford Scipio, Mableton, GA (US); Sanji Ekanayake, Mableton, GA (US)

(73) Assignee: General Electric Company, Schenectady, NY (US)

( * ) Notice: Subject to any disclaimer, the term of this patent is extended or adjusted under 35 U.S.C. 154(b) by 303 days.

(21) Appl. No.: 14/969,032

(22) Filed: Dec. 15, 2015

(65) Prior Publication Data
US 2017/0167375 A1 Jun. 15, 2017

(51) Int. Cl.
| | |
|---|---|
| F02C 7/18 | (2006.01) |
| F02C 6/06 | (2006.01) |
| F02C 3/04 | (2006.01) |
| F02C 6/18 | (2006.01) |
| H02K 7/18 | (2006.01) |
| F01D 25/30 | (2006.01) |

(52) U.S. Cl.
CPC ............. *F02C 6/06* (2013.01); *F01D 25/305* (2013.01); *F02C 3/04* (2013.01); *F02C 6/18* (2013.01); *H02K 7/1823* (2013.01)

(58) Field of Classification Search
CPC .... F02C 6/08; F02C 9/18; F02C 7/185; F02C 6/18; F01D 25/30; F01D 25/305; F01K 23/10

USPC .......................................................... 60/39.5
See application file for complete search history.

(56) References Cited

U.S. PATENT DOCUMENTS

| | | | | |
|---|---|---|---|---|
| 4,254,618 | A | * | 3/1981 | Elovic ..................... F02C 7/185 60/226.1 |
| 5,581,996 | A | * | 12/1996 | Koch ...................... F01D 5/141 60/266 |
| 5,611,197 | A | * | 3/1997 | Bunker ................... F02C 7/185 415/115 |
| 5,867,987 | A | | 2/1999 | Halimi et al. |

(Continued)

OTHER PUBLICATIONS

Co-pending U.S. Appl. No. 14/969,051, filed Dec. 15, 2015.
(Continued)

*Primary Examiner* — William H Rodriguez
(74) *Attorney, Agent, or Firm* — Dority & Manning, P.A.

(57) ABSTRACT

A power plant includes a gas turbine having a combustor downstream from a compressor, a turbine disposed downstream from the combustor and an exhaust duct downstream from an outlet of the turbine. The combustor includes an extraction port that is in fluid communication with a hot gas path of the combustor. The extraction port defines a flow path for a stream of combustion gas to flow out of the hot gas path. The exhaust duct receives exhaust gas from the turbine outlet. A coolant injection system injects a coolant into the stream of combustion gas upstream from the exhaust duct such that the stream of combustion gas blends with the exhaust gas from the turbine within the exhaust duct and forms an exhaust gas mixture within the exhaust duct. A heat exchanger is disposed downstream from the exhaust duct and receives the exhaust gas mixture from the exhaust duct.

18 Claims, 4 Drawing Sheets

(56) References Cited

U.S. PATENT DOCUMENTS

| | | | | |
|---|---|---|---|---|
| 6,065,282 A * | 5/2000 | Fukue | | F02C 7/185 |
| | | | | 415/115 |
| 6,098,395 A * | 8/2000 | North | | F01D 5/085 |
| | | | | 60/782 |
| 6,233,940 B1 * | 5/2001 | Uji | | F01K 21/047 |
| | | | | 60/39.01 |
| 6,250,061 B1 * | 6/2001 | Orlando | | F01D 9/065 |
| | | | | 60/772 |
| 6,442,941 B1 | 9/2002 | Anand et al. | | |
| 6,487,863 B1 * | 12/2002 | Chen | | F02C 6/08 |
| | | | | 60/39.12 |
| 6,543,234 B2 | 4/2003 | Anand et al. | | |
| 6,615,574 B1 * | 9/2003 | Marks | | F02C 7/18 |
| | | | | 60/772 |
| 8,209,951 B2 | 7/2012 | Hibshman, II | | |
| 8,844,262 B2 | 9/2014 | Sutterfield | | |
| 9,003,762 B2 * | 4/2015 | Scipio | | F01D 25/30 |
| | | | | 60/39.5 |
| 9,103,279 B2 | 8/2015 | Zhang et al. | | |
| 2009/0285680 A1 * | 11/2009 | Hess | | F01D 5/081 |
| | | | | 416/1 |
| 2009/0320496 A1 * | 12/2009 | Faulder | | F01D 25/305 |
| | | | | 60/785 |
| 2010/0175387 A1 * | 7/2010 | Foust | | F01D 9/023 |
| | | | | 60/782 |
| 2010/0215480 A1 * | 8/2010 | Leach | | F02C 9/18 |
| | | | | 415/145 |
| 2013/0219921 A1 * | 8/2013 | Wiebe | | F01D 9/023 |
| | | | | 60/785 |
| 2013/0340439 A1 * | 12/2013 | Ekanayake | | F02C 7/047 |
| | | | | 60/779 |
| 2014/0090354 A1 * | 4/2014 | Scipio | | F01D 25/30 |
| | | | | 60/39.5 |
| 2014/0230444 A1 * | 8/2014 | Hao | | F01D 25/305 |
| | | | | 60/772 |
| 2014/0373504 A1 * | 12/2014 | Broker | | F01D 25/30 |
| | | | | 60/39.5 |
| 2015/0132101 A1 * | 5/2015 | Marsh | | F01D 25/12 |
| | | | | 415/1 |
| 2015/0354465 A1 * | 12/2015 | Suciu | | F02C 3/04 |
| | | | | 60/782 |
| 2015/0361890 A1 * | 12/2015 | Suciu | | F02C 9/18 |
| | | | | 60/785 |
| 2016/0273403 A1 * | 9/2016 | Ekanayake | | F01K 23/10 |
| 2016/0273408 A1 * | 9/2016 | Ekanayake | | F02C 3/04 |
| 2016/0273409 A1 * | 9/2016 | Ekanayake | | F01K 23/105 |
| 2016/0376958 A1 * | 12/2016 | Davis, Jr. | | F01N 3/05 |
| | | | | 60/39.5 |

OTHER PUBLICATIONS

Co-pending U.S. Appl. No. 14/969,594, filed Dec. 15, 2015.
Co-pending U.S. Appl. No. 14/969,067, filed Dec. 15, 2015.
Co-pending U.S. Appl. No. 14/969,079, filed Dec. 15, 2015.
Co-pending U.S. Appl. No. 14/969,098, filed Dec. 15, 2015.
Co-pending U.S. Appl. No. 14/969,224, filed Dec. 15, 2015.
Co-pending U.S. Appl. No. 14/969,118, filed Dec. 15, 2015.
Co-pending U.S. Appl. No. 14/969,142, filed Dec. 15, 2015.
Co-pending U.S. Appl. No. 14/969,157, filed Dec. 15, 2015.
Co-pending U.S. Appl. No. 14/969,165, filed Dec. 15, 2015.
Co-pending U.S. Appl. No. 14/969,185, filed Dec. 15, 2015.
Co-pending U.S. Appl. No. 14/969,200, filed Dec. 15, 2015.

* cited by examiner

POWER PLANT WITH STEAM GENERATION VIA COMBUSTOR GAS EXTRACTION

FIELD OF THE DISCLOSURE

The present disclosure generally relates to a gas turbine power plant such as a combined cycle or cogeneration power plant. More particularly, the present disclosure relates to a power plant configured for generating steam using combustion gas extracted from a combustor.

BACKGROUND OF THE DISCLOSURE

A gas turbine power plant such as a combined cycle or cogeneration power plant generally includes a gas turbine having a compressor, a combustor, a turbine, a heat recovery steam generator (HRSG) that is disposed downstream from the turbine and a steam turbine in fluid communication with the HRSG. During operation, air enters the compressor via an inlet system and is progressively compressed as it is routed towards a compressor discharge or diffuser casing that at least partially surrounds the combustor. At least a portion of the compressed air is mixed with a fuel and burned within a combustion chamber defined within the combustor, thereby generating high temperature and high pressure combustion gas.

The combustion gas is routed along a hot gas path from the combustor through the turbine where they progressively expand as they flow across alternating stages of stationary vanes and rotatable turbine blades which are coupled to a rotor shaft. Kinetic energy is transferred from the combustion gas to the turbine blades thus causing the rotor shaft to rotate. The rotational energy of the rotor shaft may be converted to electrical energy via a generator. The combustion gas exits the turbine as exhaust gas and the exhaust gas enters the HRSG. Thermal energy from the exhaust gas is transferred to water flowing through one or more heat exchangers of the HRSG, thereby producing superheated steam. The superheated steam is then routed into the steam turbine which may be used to generate additional electricity, thus enhancing overall power plant efficiency.

Regulatory requirements for low emissions from gas turbine based power plants have continually grown more stringent over the years. Environmental agencies throughout the world are now requiring even lower levels of emissions of oxides of nitrogen (NOx) and other pollutants and carbon monoxide (CO) from both new and existing gas turbines.

Traditionally, due at least on part to emissions restrictions, the gas turbine load for a combined cycle or cogeneration power plant has been coupled to or driven by steam production requirements for the power plant and not necessarily by grid power demand. For example, to meet power plant steam demand while maintaining acceptable emissions levels, it may be necessary to operate the gas turbine at full-speed full-load conditions, even when grid demand or power plant demand for electricity is low, thereby reducing overall power plant efficiency.

BRIEF DESCRIPTION

Aspects and advantages of the disclosure are set forth below in the following description, or may be obvious from the description, or may be learned through practice of the disclosure.

One embodiment is directed to a power plant. The power plant includes a gas turbine having a combustor downstream from a compressor, a turbine disposed downstream from the combustor and an exhaust duct downstream from an outlet of the turbine. The combustor includes an extraction port that is in fluid communication with a hot gas path of the combustor. The extraction port defines a flow path for a stream of combustion gas to flow out of the hot gas path. The exhaust duct receives exhaust gas from the turbine outlet. A coolant injection system injects a coolant into the stream of combustion gas upstream from the exhaust duct such that the stream of combustion gas blends with the exhaust gas from the turbine within the exhaust duct and forms an exhaust gas mixture within the exhaust duct. A heat exchanger is disposed downstream from the exhaust duct and receives the exhaust gas mixture from the exhaust duct.

Those of ordinary skill in the art will better appreciate the features and aspects of such embodiments, and others, upon review of the specification.

BRIEF DESCRIPTION OF THE DRAWINGS

A full and enabling disclosure, including the best mode thereof to one skilled in the art, is set forth more particularly in the remainder of the specification, including reference to the accompanying figures, in which.

DETAILED DESCRIPTION

Figure 1:
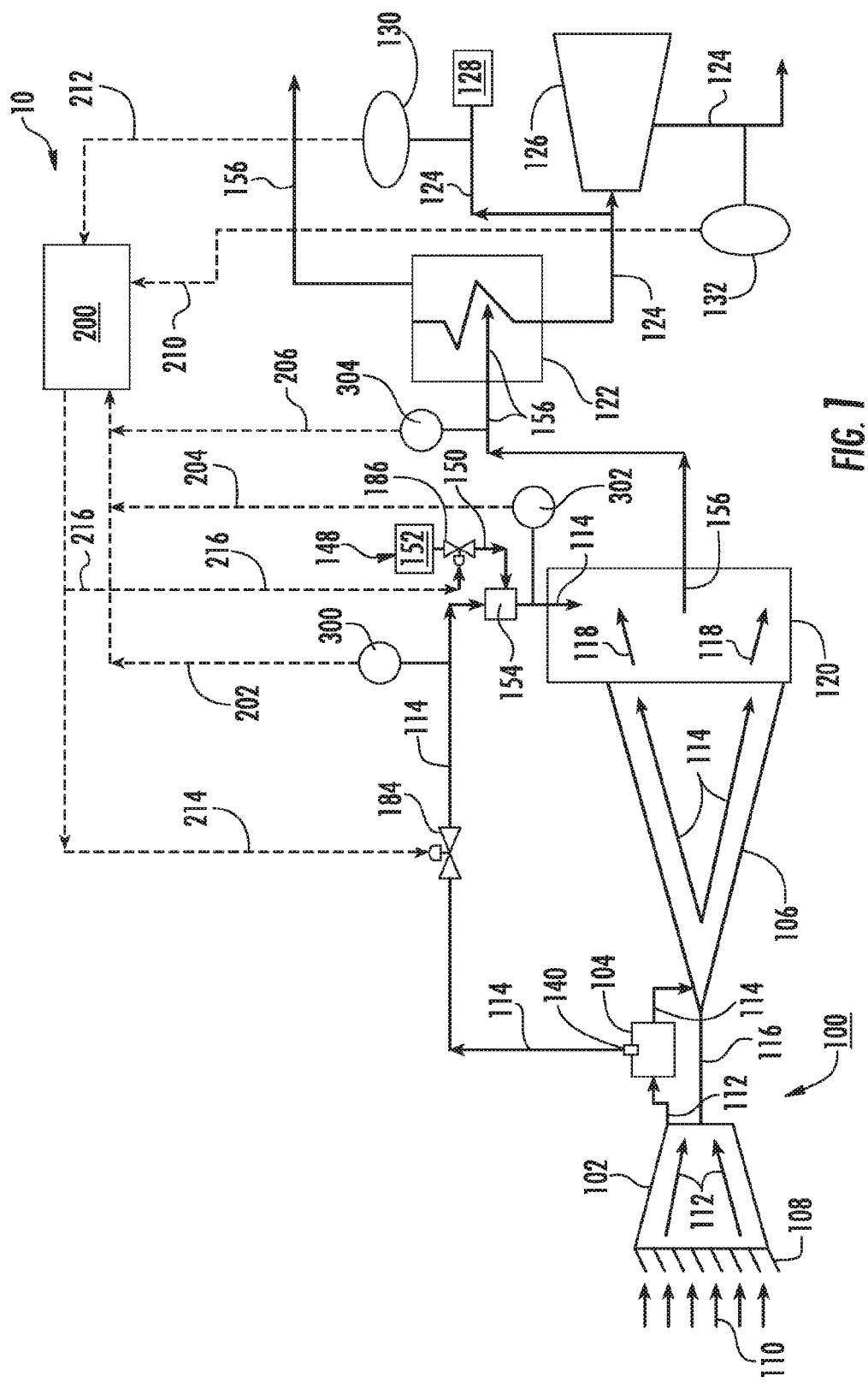
FIG. 1 is a schematic diagram of an exemplary gas turbine based cogeneration power plant according to one embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts within the disclosure. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation of the disclosure, not limitation of the disclosure. In fact, it will be apparent to those skilled in the art that modifications and variations can be made in the present disclosure without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

In a conventional co-generation power plant, fuel and air are supplied to a gas turbine. Air passes through an inlet of the gas turbine into the compressor section upstream of combustors in the gas turbine. After the air is heated by combustors, the heated air and other gases produced in the process (i.e., combustion gas) pass through the turbine section. The full volume of exhaust gas from the gas turbine passes from the turbine section to an exhaust section of the gas turbine, and flows to a heat recovery steam generator (HRSG) that extracts heat from the exhaust gas via one or more heat exchangers to produce steam.

In certain instances, the demand for steam may be lower than the amount of steam that could be generated by the gas turbine exhaust, some of the exhaust gas could be directed away from the heat recovery steam generator, such as being transported to an exhaust stack that filters the exhaust gas prior to being released into the atmosphere. Alternatively, if steam production is in higher demand than the steam generated by the gas turbine exhaust, then an increase in exhaust gas from the gas turbine could be produced to generate the steam desired.

The present embodiments provide a system that cools combustion gas extracted directly from a combustor of a gas turbine prior to being mixed with exhaust gas flowing from an outlet of the turbine. Although the combustion gas is cooled via a gas cooler, the cooled combustion gas is still significantly hotter than exhaust gas flowing from the turbine. As a result, the thermal energy from the cooled combustion gas raises the temperature of the exhaust gas upstream from a heat exchanger/boiler and/or heat recovery steam generator (HRSG), thereby enhancing steam production from the gas turbine.

The steam may be piped to a steam turbine, used for heat production and/or for other industrial processes. The system can be used in a cogeneration system such that the cogeneration system can produce a higher quantity of steam without producing a proportional increase of power. The embodiment system thus provides an efficient use of the fuel input into the cogeneration system, and avoids wasteful production of undesired power by the gas turbine.

The embodiments provided herein provide various technical advantages over existing cogenerations or combined cycle power plants. For example, the system provided herein may include the ability to modulate steam production at a desired level while maintaining thermal and other operating efficiencies; the ability to provide a higher temperature gas to produce more steam downstream of the gas turbine; the ability to operate at a lower power output on the gas turbine and generate more steam; the ability to minimize wasteful products (i.e., producing unnecessary power in the gas turbine); and the ability to operate a cogeneration system at a more cost effective and efficient capacity.

Referring now to the drawings, wherein identical numerals indicate the same elements throughout the figures, FIG. 1 provides a functional block or flow diagram of an exemplary gas turbine power plant 10 with steam production capability. The power plant 10 comprises a gas turbine 100 that may incorporate various embodiments of the present disclosure. The gas turbine 100 generally includes, in serial flow order, a compressor 102, a combustion section having one or more combustors 104 and a turbine 106. The gas turbine 100 may also include inlet guide vanes 108 disposed at an inlet or upstream end of the compressor 108. In operation, air 110 flows across the inlet guide vanes 108 and into the compressor 102. The compressor 102 imparts kinetic energy to the air 110 to produce compressed air as indicated schematically by arrows 112.

The compressed air 112 is mixed with a fuel such as natural gas from a fuel supply system to form a combustible mixture within the combustor(s) 104. The combustible mixture is burned to produce combustion gas as indicated schematically by arrows 114 having a high temperature, pressure and velocity. The combustion gas 114 flows through various turbine stages of the turbine 106, thus casing shaft 116 to rotate and produce work.

The turbine 106 may have two or more stages, for example, a low pressure section and a high pressure section. In one embodiment, the turbine 106 may be a two-shaft turbine that includes a low pressure section and a high pressure section. In particular configurations, the turbine 106 may have 4 or more stages. The turbine 106 may be connected to a shaft 116 so that rotation of the turbine 106 drives the compressor 102 to produce the compressed air 112. Alternately or in addition, the shaft 116 may connect the turbine 106 to a generator (not shown) for producing electricity. The combustion gas 114 loses thermal and kinetic energy as it flows through the turbine 106 and exits the turbine 106 as exhaust gas 118 via an exhaust duct 120 that is operably coupled to a downstream end of the turbine 106.

The exhaust duct 120 may be fluidly coupled to a heat exchanger or boiler 122 via various pipes, ducts, valves and the like. The heat exchanger 122 may be a standalone component or may be a component of a heat recovery steam generator (HRSG). In various embodiments, the heat exchanger 122 is used to extract thermal energy from the exhaust gas 118 to produce steam 124. In particular embodiments, the steam 124 may then be routed to a steam turbine 126 via various pipes, valves conduits or the like to produce additional power or electricity.

At least a portion of the steam 124 may be piped from the heat exchanger 122 to an onsite or offsite facility 128 that distributes the steam to users and/or utilizes the steam for secondary operations such as heat production or other industrial operations or processes. In one embodiment, the steam 124 may be piped downstream from the steam turbine 126 and further utilized for various secondary operations such as heat production or other secondary operations. Steam flow rate or output from the heat exchanger 122 may be monitored via one or more flow monitors. For example, in one embodiment, a flow monitor 130 may be provided downstream from the heat exchanger 122. In one embodiment, a flow monitor 132 may be disposed downstream from the steam turbine 126.

Figure 2:
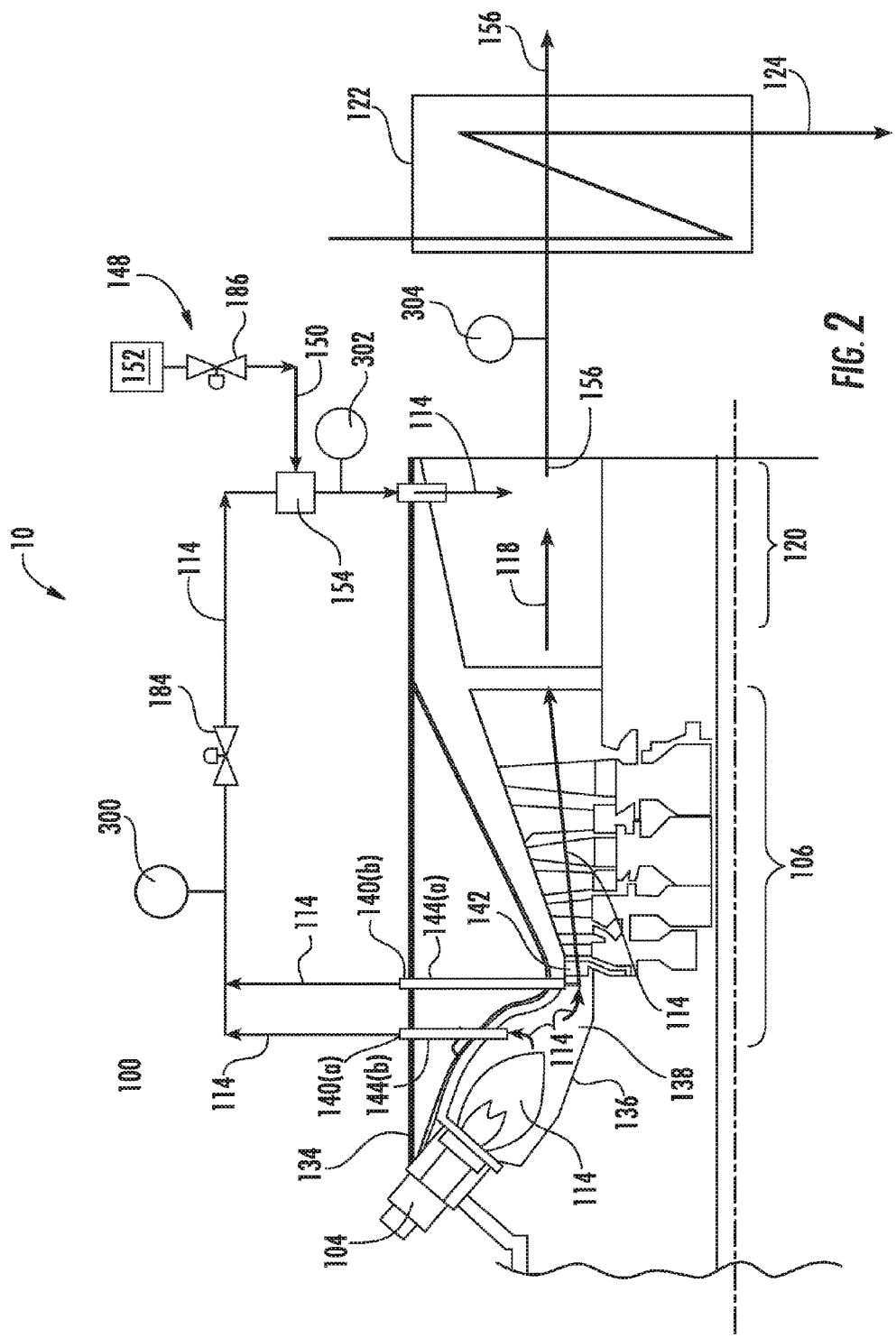
FIG. 2 is a simplified cross sectioned side view of a portion of an exemplary gas turbine according to at least one embodiment of the present disclosure.

FIG. 2 provides a simplified cross sectional side view of a portion of an exemplary gas turbine 100 including a portion of the combustor 104, the turbine 106 and the exhaust duct 120 as may incorporate various embodiments of the present disclosure. In one embodiment, as shown in FIG. 2, the turbine 106 includes an outer casing 134 that at least partially encases the combustor 104. The combustor 104 includes one or more ducts or liners 136 that at least partially define a hot gas path 138 within the outer casing 134. A downstream end of the turbine 106 is operably connected to the exhaust duct 120. Conventionally, the entire volume of combustion gas 114 passes through the hot gas path 138, into the turbine and exits the turbine via the exhaust duct 120.

During operation, if it is determined that the demand for steam production is higher than the demand for power produced by the gas turbine 100, a portion of the combustion gas 114 may be extracted from the combustor 104 via one or more extraction ports 140 that are in fluid communication with the hot gas path 138 defined by the one or more ducts 136. Two extraction ports 140(*a*), 140(*b*) are shown for illustration. However, the combustor 104 may include any number of extraction ports 140 positioned at the same or different axial locations along the outer casing and/or the combustor 104 with respect to centerline 12. Each extraction port 140 provides a flow path for a stream of the combustion gas 114 to flow out of the combustor 104 a point or location that is upstream from an inlet of first stage nozzle 142 of the turbine 106.

As shown in FIG. 2, one or more of the combustor extraction ports 140(*a*), 140(*b*) may be in fluid communication with the hot gas path 138 via one or more extraction pipes 144(*a*), 144(*b*). The extraction pipe(s) 144 and the combustor extraction ports 140 provide for fluid communication of the combustion gas 114 from the hot gas path 138, through the outer casing 134 and out of the combustor 104 to obtain a portion of the combustion gas 114 at higher temperatures than the exhaust gas 118 flowing into the exhaust duct 120 from the outlet of the turbine 106.

Figure 3:
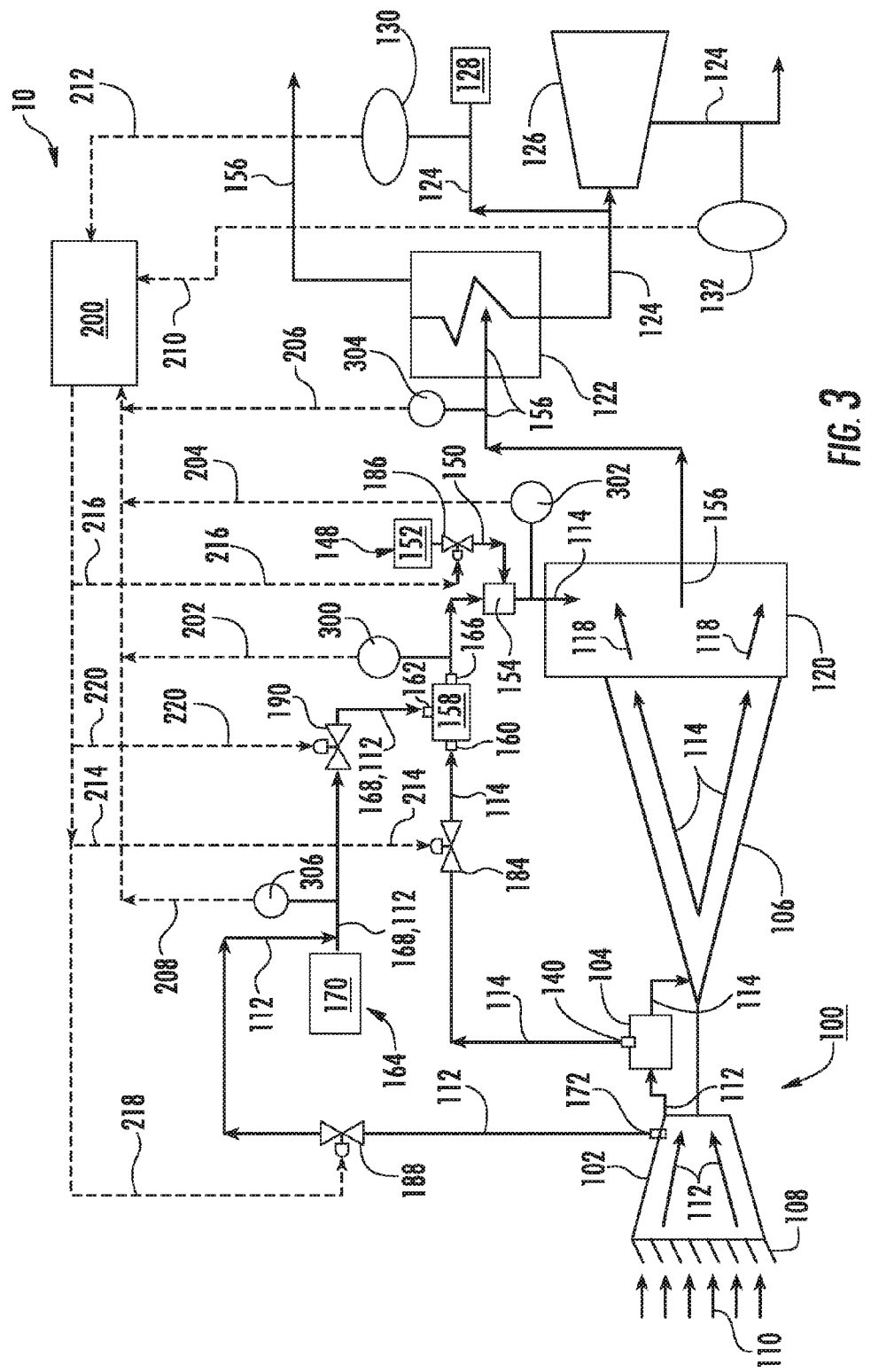
FIG. 3 is a schematic diagram of the exemplary gas turbine based cogeneration power plant as shown in FIG. 1, according to one embodiment of the present disclosure.
Figure 4:
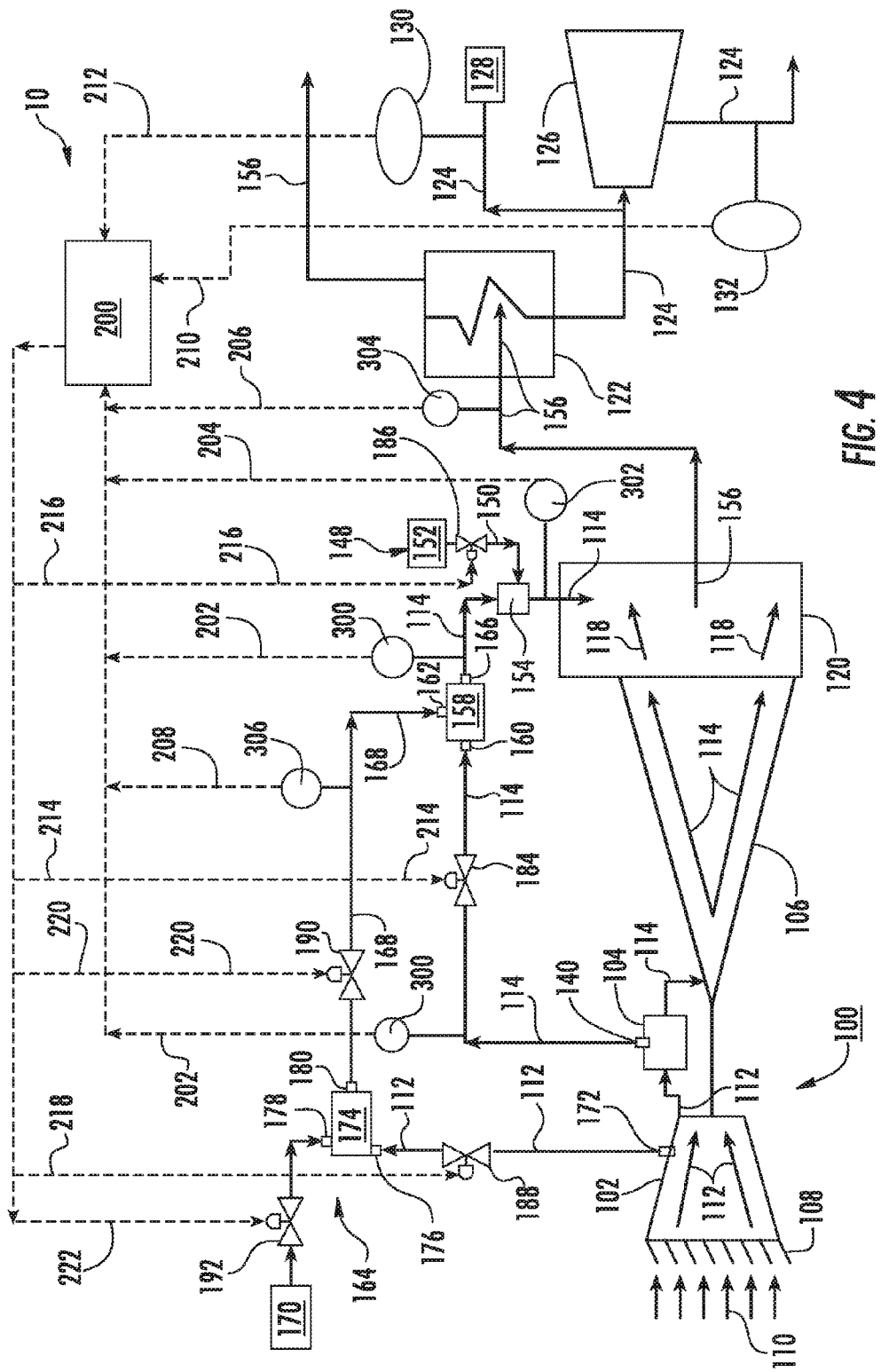
FIG. 4 is a schematic diagram of the exemplary gas turbine based cogeneration power plant as shown in FIG. 1, according to one embodiment of the present disclosure.

FIGS. 3 and 4 provide functional block diagrams of the exemplary gas turbine power plant 10 with steam production capability as shown in FIG. 1, according to various embodiments of the present disclosure. In particular embodiments, as shown in FIGS. 1, 2, 3 and 4, the power plant 10 may further comprise a coolant injection system 148 disposed downstream from the extraction port(s) 140 and upstream from the exhaust duct 120. The coolant injection system 148 may include spray nozzles, a spray tower, a scrubber or other various components (not shown) configured to inject a coolant 150 from a coolant supply 152 into the stream of combustion gas 114 flowing from the extraction port(s) 140 into the exhaust duct 120.

In particular embodiments, as shown in FIGS. 1-4, the coolant injection system 148 includes a mixing chamber 154 fluidly coupled to and positioned downstream from the extraction port(s) 140. The mixing chamber 154 may be fluidly coupled to the exhaust duct 120 via various pipes, conduits, valves or the like. The mixing chamber 154 may be configured to blend the coolant 150 with the stream of combustion gas 114 upstream of the exhaust duct 120. In this manner, the coolant 150 may be used to reduce or control the temperature of the combustion gas 114 upstream from the heat exchanger 122 and/or the exhaust duct 120. In one embodiment, the coolant 150 is water. In one embodiment the coolant 150 comprises steam.

In operation, the combustion gas 114 from the extraction port(s) 140 and/or the coolant injection system 148 blends with the exhaust gas 118 within the exhaust duct 120 to provide a heated exhaust gas mixture 156 to the heat exchanger 122 disposed downstream from the exhaust duct 120. Thermal energy from the combustion gas 114 increases the temperature of the exhaust gas 118, thereby increasing steam production capability of the power plant 10.

In one embodiment, as shown in FIGS. 3 and 4, the power plant 10 includes a first gas cooler 158. The first gas cooler 158 includes a primary inlet 160 fluidly coupled to one or more of the one or more extraction ports 140, a secondary inlet 162 fluidly coupled via various pipes, conduits, valves or the like to a coolant supply system 164, and an outlet 166 in fluid communication with the exhaust duct 120 via various pipes, conduits, valves or the like. In one embodiment, the first gas cooler 158 comprises an ejector. In one embodiment, the first gas cooler 158 comprises a static mixer. The static mixer generally includes individual mixing elements stacked in series within an outer casing or pipe and in fluid communication with the primary and secondary inlets 160, 162 and with the outlet 166. Each mixing element may be oriented relative to an adjacent mixing element to homogenize two or more fluids flowing through static mixer.

The coolant supply system 164 provides a coolant 168 to the secondary inlet 162 of the first gas cooler 158. In particular embodiments, as shown in FIGS. 1 and 3, the coolant supply system 164 comprises an ambient air supply system 170 for collecting and/or conditioning ambient air upstream from the secondary inlet 162 of the first gas cooler 158.

In particular embodiments, as shown in FIG. 4, the coolant supply system 164 includes the compressor 102 of the gas turbine 100. The compressor 102 may be fluidly coupled to the secondary inlet 162 of the first gas cooler 158 via one or more compressor extraction ports 172 and via various pipes, conduits, valves or the like.

The compressor extraction port(s) 172 provide a flow path for a portion of the compressed air 112 to flow out the compressor 102 at a point between an upstream or inlet to the compressor 102 and an outlet of the compressor 102 that is defined upstream or immediately upstream from the combustor 102. Because the compressed air 112 increases in pressure and temperature from the inlet to the outlet, the compressor extraction port(s) 172 may be axially spaced along the compressor 102 at various points to capture a portion of the compressed air 112 at a desired temperature and pressure. In this manner, the compressed air 112 may supplement the coolant 168 or flow in place of the coolant 168.

In operation, the extracted combustion gas 114 from the one or more extraction ports 140 acts as a motive fluid flowing through the first gas cooler 158. Air from the ambient air supply 170 or a portion of the compressed air 112 extracted from the compressor extraction port(s) 172 flows into the secondary inlet 162 of the first gas cooler 158 and cools the stream of combustion gas 114 upstream from the exhaust duct 120 and may also increase mass flow from the first gas cooler 158 into the exhaust duct 120. The stream of combustion gas 114 may then through the mixing chamber 154 and/or otherwise blend with the coolant 150 from the coolant injection system 148 before entering the exhaust duct 120 at a higher temperature than the exhaust gas 118. Thermal energy from the combustion gas 114 increases the temperature of the exhaust gas 118, thereby increasing overall steam production capability of the power plant 10.

In particular embodiments, as shown in FIG. 4, the coolant supply system 164 may include a second gas cooler 174 disposed downstream from the compressor extraction port(s) 172 and upstream from the secondary inlet 162 of the first gas cooler 158. The second gas cooler 174 may be fluidly coupled to the compressor extraction port(s) 172 and to the secondary inlet 162 of the first gas cooler 158 via various pipes, conduits, valves or the like. The second gas cooler 174 includes a primary inlet 176 fluidly coupled to the compressor extraction port(s) 172, a secondary inlet 178 in fluid communication with the ambient air supply system 170 and an outlet 180 in fluid communication with the secondary inlet 162 of the first gas cooler 158.

In operation, the compressed air 112 from the compressor extraction port(s) 172 acts as a motive fluid through the second gas cooler 174. Air entering the secondary inlet 178 of the second gas cooler 174 from the ambient air supply system 170 cools the stream of compressed air 112 upstream from the secondary inlet 162 of the first gas cooler 158, thereby enhancing cooling of the combustion gases 114 flowing therethrough. The air flowing into the second gas cooler 174 may also increase air mass flow from the compressor extraction port(s) 172 into the first gas cooler 158.

Referring to FIGS. 1, 2, 3 and 4 collectively, a controller 200 may be used to determine the desired steam production capacity and/or to regulate flow of the combustion gas 114 to the exhaust duct 120 by generating and/or sending appropriate control signals to various control valves 184 fluidly coupled to one or more of the extraction ports 140 of the combustor 104, one or more control valves 186 of the coolant injection system 172 and/or to one or more control valves 188, 190, 192 of the coolant supply system 164.

The controller 200 may be a microprocessor based processor that includes a non-transitory memory and that has the capability to calculate algorithms. The controller 200 may incorporate a General Electric SPEEDTRONIC™ Gas Turbine Control System, such as is described in Rowen, W. I., "SPEEDTRONIC™ Mark V Gas Turbine Control System", GE-3658D, published by GE Industrial & Power Systems of Schenectady, N.Y. The controller 200 may also incorporate a computer system having a processor(s) that executes programs stored in a memory to control the operation of the gas turbine using sensor inputs and instructions from human operators.

In particular embodiments, the controller 200 is programmed to determine a desired temperature of the exhaust gas mixture 156 required to generate the desired amount of steam flow, to regulate combustion gas flow through valve(s) 184, coolant flow from the coolant injection system 148 via control valve 186, air or coolant flow through valve(s) 188, 190, 192 so as to achieve the desired temperature of the exhaust gas mixture 156 being sent to heat exchanger 122.

In operation, as shown in FIGS. 1, 2, 3 and 4 collectively, the controller 200 may receive one or more input data signals, such as combustion gas temperature 202, 204 from temperature monitors 300, 302 disposed downstream from the extraction port(s) 140, exhaust gas mixture temperature 206 from a temperature monitor 304 (FIGS. 1-3) disposed downstream from the exhaust duct 120 and/or upstream from the heat exchanger 122, coolant temperature 208 from a temperature monitor 306 (FIG. 3) disposed downstream from the outlet 180 of the second gas cooler 174 and/or downstream from the ambient air supply system 170 and/or the compressor extraction port 172.

The controller 200 may also receive steam flow data 210 from flow monitor 132 and/or steam flow data 212 from flow monitor 130. In response to one or more data signals 202, 204, 206, 208, 210, 212 the controller 200 may actuate one or more of valve(s) 184, 186, 188, 190, 192 to control one or more of combustion gas flow from the combustor 104, coolant flow rate from the coolant injection system 172, air or coolant flow rate into the first gas cooler 158 secondary inlet 162 to produce the desired temperature of the exhaust gas mixture 156.

Steam flow output from the steam turbine 126 may be monitored via the controller 200 using flow monitor 132. Steam flow output to secondary operations may be monitored via the controller 200 using flow monitor 130. In response to the steam flow output signals 210, 212, controller 200 may actuate one or more of valve(s) 184, 186, 188, 190, 192 to control one or more of combustion gas flow from the combustor 104, coolant flow rate from the coolant injection system 172, air or coolant flow rate into the first gas cooler 158 secondary inlet 162 to produce the desired temperature of the exhaust gas mixture 156.

Data signals received by the controller 200, such as combustion gas temperature, cooled combustion gas temperature, exhaust gas temperature, mixed exhaust gas temperature and steam flow rate may be analyzed to compare with a predetermined desired amount of steam flow. The controller 200 may use the one or more of the received data signals 202, 204, 206, 208, 210, 212 to determine if an increase in exhaust gas temperature is needed. Calculations include determining the quantity of steam needed and the amount of power desired, and determining the temperature and quantity of combustion gas needed to produce the desired quantity of steam and/or for supporting secondary operations.

As shown in FIGS. 1, 3 and 4 collectively, after determining the desired temperature and quantity of combustion gas 114 required for the heat exchanger 122 to produce desired steam quantity, the controller 200 may generate and send signal 214 to the receiver of control valve 184 to extract a desired amount of combustion gas 114 from the hot gas path 138 through the outer casing 134. The controller 200 may send signal 216 to the receiver of control valve 186 to control the flow rate of the coolant 150 flowing from the coolant injection system 148. The controller 200 may send one or more of signals 218, 220, 222 to the receiver(s) of one or more of control valves 188, 190, 192 to control the flow rate of the compressed air 112, coolant 168 and or air flowing from the ambient air supply 170. The controller 200 and/or the system or systems provided herein may automatically blend the exhaust gas 118 with the stream of combustion gas 114 so that the temperature of the exhaust gas mixture 156 is above a nominal exhaust gas temperature but below the thermal limits of the exhaust duct 120, the heat exchanger 122 or HRSG.

Although specific embodiments have been illustrated and described herein, it should be appreciated that any arrangement, which is calculated to achieve the same purpose, may be substituted for the specific embodiments shown and that the disclosure has other applications in other environments. This application is intended to cover any adaptations or variations of the present disclosure. The following claims are in no way intended to limit the scope of the disclosure to the specific embodiments described herein.

What is claimed:

1. A power plant, comprising:
a gas turbine including a combustor downstream from a compressor, a turbine disposed downstream from the combustor and an exhaust duct downstream from an outlet of the turbine, the combustor including an extraction port in fluid communication with a hot gas path of the combustor, the extraction port defining a flow path for a stream of combustion gas to flow out of the hot gas path upstream from the turbine, wherein the exhaust duct receives exhaust gas from the turbine outlet;
a coolant injection system fluidly coupled between the extraction port and the exhaust duct, wherein the coolant injection system injects a coolant into the stream of combustion gas upstream from the exhaust duct, and wherein the stream of combustion gas blends with the exhaust gas from the turbine within the exhaust duct upstream and forms an exhaust gas mixture; and a heat exchanger disposed downstream from the exhaust duct, wherein the heat exchanger receives at least a portion of the exhaust gas mixture from the exhaust duct.

2. The power plant as in claim 1, wherein the heat exchanger receives the exhaust gas mixture from the exhaust duct and extracts thermal energy from the exhaust gas mixture to produce steam.

3. The power plant as in claim 1, further comprising a steam turbine disposed downstream from the heat exchanger.

4. The power plant as in claim 1, further comprising a first gas cooler having a primary inlet fluidly coupled to the extraction port, a secondary inlet fluidly coupled to a coolant supply system and an outlet in fluid communication with the exhaust duct.

5. The power plant as in claim 4, wherein the first gas cooler comprises an ejector.

6. The power plant as in claim 4, wherein the first gas cooler comprises an inline static mixer.

7. The power plant as in claim 4, wherein the coolant supply system comprises an ambient air intake system fluidly coupled to the secondary inlet of the first gas cooler.

8. The power plant as in claim 4, wherein the coolant supply system comprises the compressor of the gas turbine, wherein the compressor is fluidly coupled to the secondary inlet of the first gas cooler via a compressor extraction port.

9. The power plant as in claim 1, further comprising a first gas cooler having a primary inlet fluidly coupled to the extraction port, a secondary inlet fluidly coupled to a coolant supply system and an outlet in fluid communication with the exhaust duct, and wherein the coolant supply system comprises a second gas cooler having a primary inlet fluidly coupled to the compressor, a secondary inlet fluidly coupled to an ambient air intake system and an outlet in fluid communication with the secondary inlet of the first gas cooler.

10. The power plant as in claim 9, wherein the second gas cooler comprises an ejector.

11. The power plant as in claim 9, wherein the second gas cooler comprises an inline static mixer.

12. The power plant as in claim 1, wherein the combustor comprises an outer casing and an extraction pipe in fluid communication with the hot gas path, wherein the extraction pipe is in fluid communication with the extraction port.

13. The power plant as in claim 1, wherein the coolant injection system includes a mixing chamber fluidly coupled to and downstream from the extraction port and upstream from the exhaust duct.

14. The power plant as in claim 1, wherein the coolant from the coolant injection system comprises water.

15. The power plant as in claim 1, wherein the coolant from the coolant injection system comprises steam.

16. The power plant as in claim 1, further comprising a controller electronically coupled to a control valve that is fluidly connected between the extraction port and the exhaust duct, wherein the controller generates a signal which causes the control valve to actuate based at least in part on a temperature data signal provided by a temperature monitor electronically coupled to the controller, and disposed between the extraction port and the exhaust duct.

17. The power plant as in claim 1, further comprising a controller electronically coupled to a control valve that is fluidly connected between a coolant supply of the coolant injection system and a mixing chamber of the coolant injection system, wherein the controller generates a signal which causes the control valve to actuate based at least in part on a temperature data signal provided by a temperature monitor electronically coupled to the controller and disposed between the mixing chamber and the exhaust duct.

18. The power plant as in claim 1, further comprising a controller electronically coupled to a control valve that is fluidly connected between the extraction port and the exhaust duct, wherein the controller generates a signal which causes the control valve to actuate based at least in part on a steam output data signal provided by a steam flow monitor disposed downstream from the heat exchanger.

* * * * *